Patented July 3, 1951

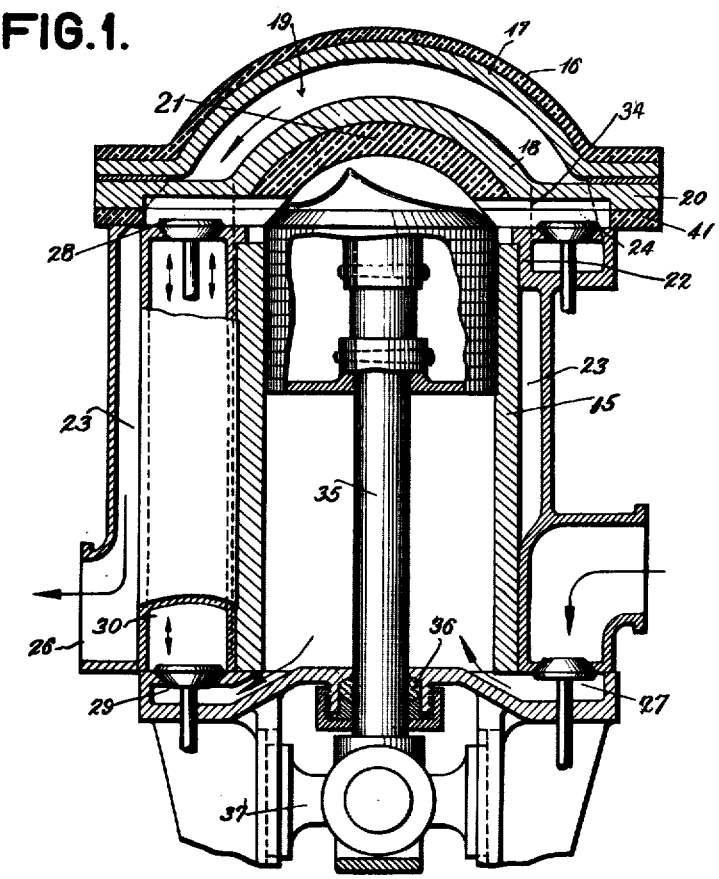

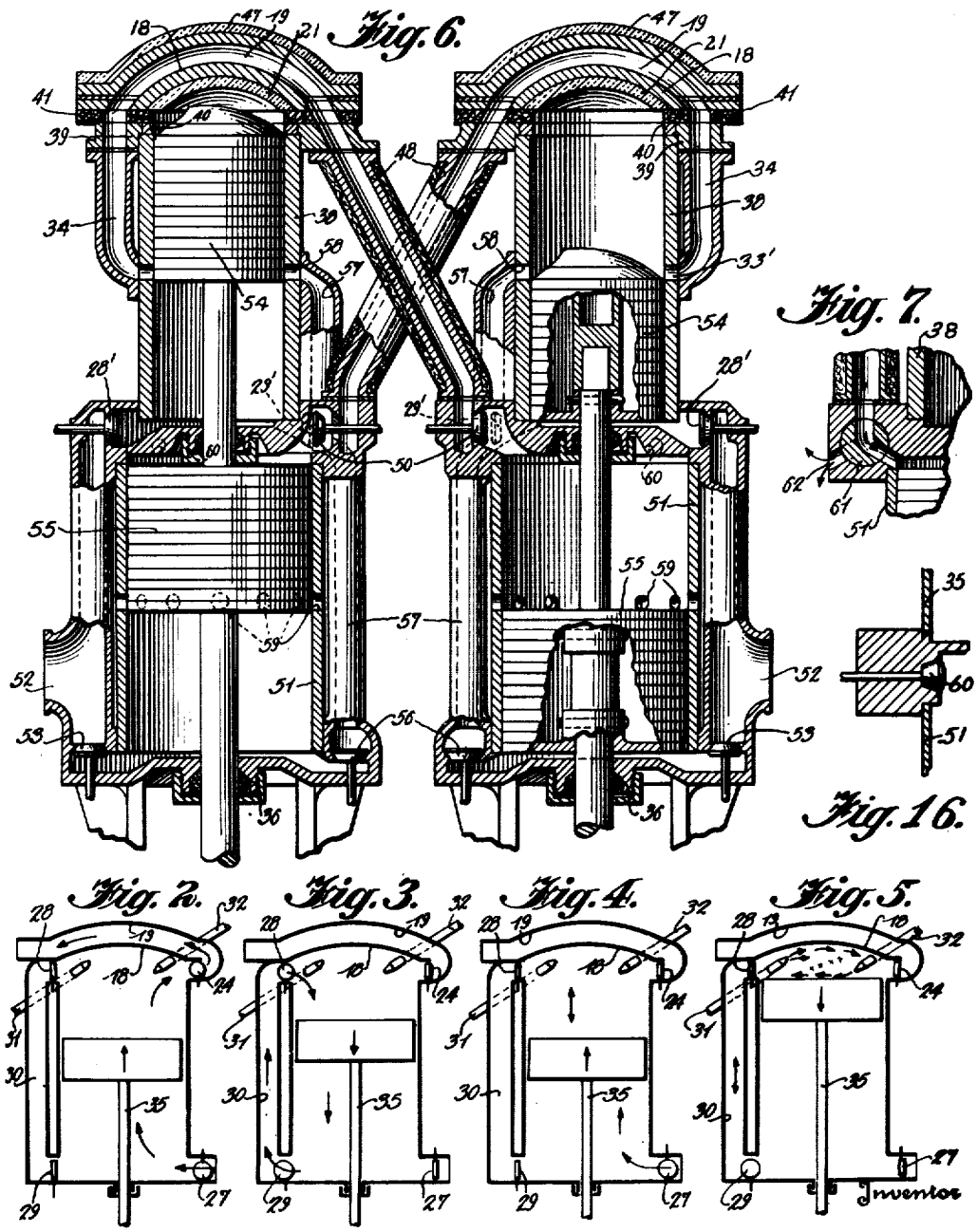

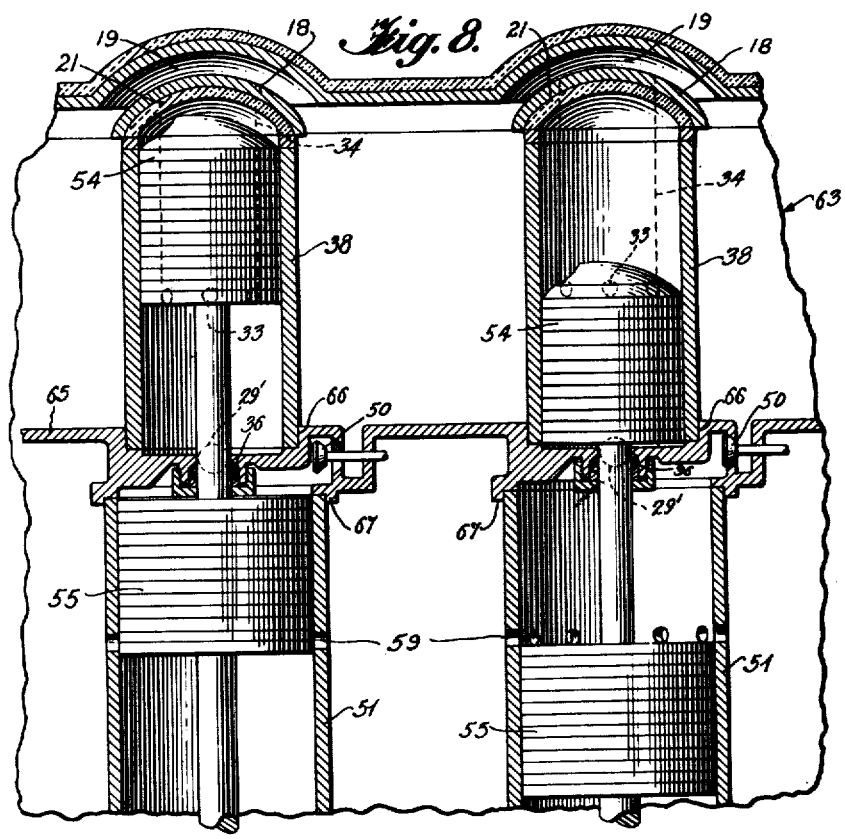
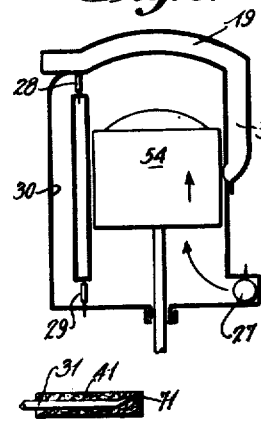
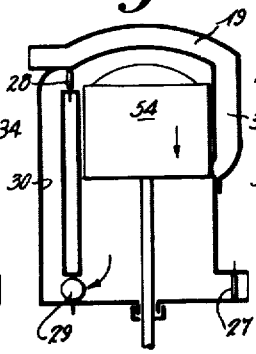
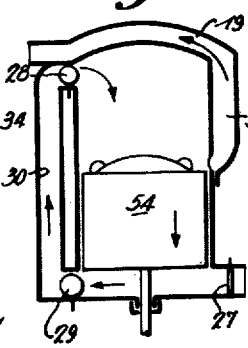
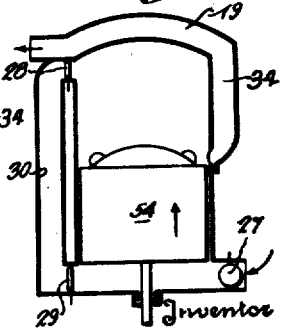

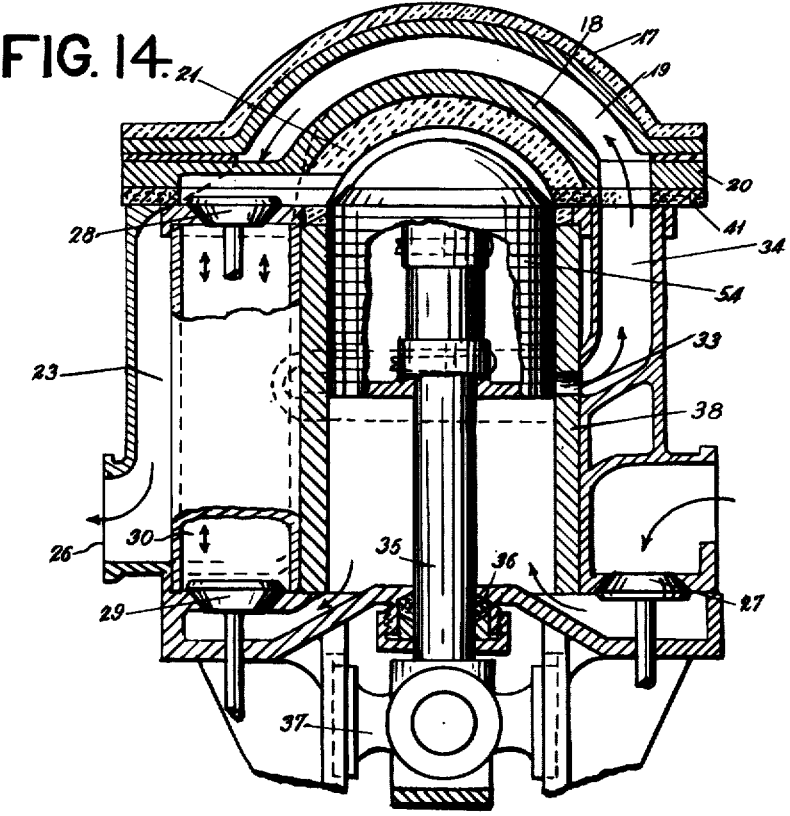

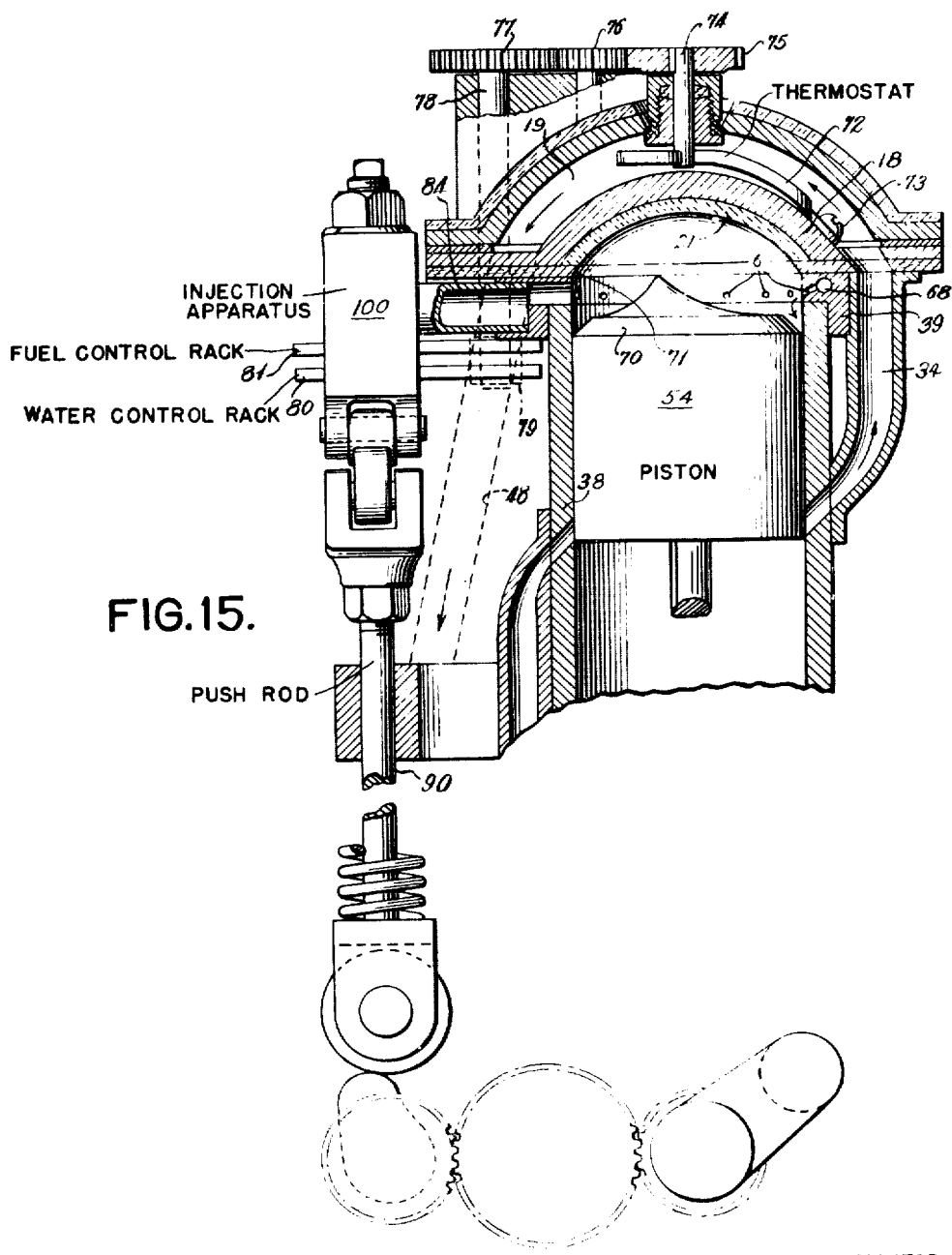

2,559,484

UNITED STATES PATENT OFFICE 2,559,484

INTERNAL-COMBUSTION ENGINE WITH COMPOUND HEAD

Edward M. Waring, Bristol, Pa., assignor of one-third to E. H. Walbridge, Libertyville, Ill., one-third to W. L. Hart, Paterson, N. J., and one-third to C. B. Blair, Poultney, Vt.

Continuation of application Serial No. 351,617, August 6, 1940. This application November 26, 1943, Serial No. 511,790

6 Claims. (Cl. 60—15)

This invention relates to engines and has as an object the provision of a combined internal combustion and steam engine with a single cylinder.

It is a further object to provide for a novel regenerating means.

It is also thus an object of the invention to provide an internal combustion engine with means to regenerate the heat of the exhaust gases before utilization for re-expansion in a turbine or a low pressure cylinder or for other use.

A further object is to provide a combined internal combustion and steam engine with means to produce higher pressures in the combustion chamber than in present practice.

A further object is to provide a compound internal combustion engine which is in effect a combination of an internal combustion engine and a steam engine.

A further object is to improve upon the manner of injecting water into the combustion chamber of an internal combustion engine for effective cooling and screening of the wall of the cylinder by steam generated from the water injected by the unwanted heat in said walls.

A further object is to provide an engine of the character referred to having storage capacity for exhaust gases under pressure during their regeneration and prior to re-expansion.

It is a further object to provide a Diesel type engine of improved efficiency.

Further objects will appear from the following descriptions when read in connection with the accompanying drawings showing illustrative embodiments of the invention and wherein Fig. 1 is a central vertical section of a combustion cylinder and parts of an engine of the four cycle type showing some principles of the invention.

Figures 2, 3, 4 and 5 are diagrammatic views showing positions of parts of Figure 1 at successive stages of a cycle of operation.

Figure 6 is a distorted vertical longitudinal view of a pair of sets of cylinders and parts.

Fig. 7 is a detail section showing a different form of valve.

Fig. 8 is a detail vertical section of two sets of cylinders of an engine with a plurality of cylinders in a common outer enclosure.

Figures 9, 10, 11 and 12 are diagrammatic views similar to Figures 2, 3, 4 and 5 but showing successive positions of the parts of the engine working on the two cycle principle.

Fig. 13 is a detail sectional view on an enlarged scale of a portion of a gasket and a fuel nozzle.

Fig. 14 is a view similar to Figure 1 showing an engine for two cycle operation;

Figure 15 is a view of a two cycle cylinder and parts with an imperforate cylinder head and the regenerator over it showing location of a thermostat for control of fuel and water injection within the regenerator; and Fig. 16 is a detail longitudinal section through valve 60 of Figure 6.

As shown in Fig. 1, a combustion cylinder is provided with a head 16 formed of two portions 17 and 18, spaced to provide a regenerator 19 for regeneration of the heat of exhaust gases from the combustion cylinder. In this view, as in some others, the means for injecting fuel and water are omitted for clarity but are illustrated in Figures 13 and 15. The cylinder head 16, as shown, comprises a heat transferring portion 18 and a heat retaining and insulating portion 21. The principle upon which the action of the engine is founded is to operate at as high a temperature as possible, consistent with the strength of the materials and the part 21 may be of some metal which is exceedingly resistant to heat or of refractory material, the object being to run the engine with the interior of the head at very high temperatures and in excess of anything heretofore attempted, which heat will be sufficient to cause the fuel to ignite much more promptly than is usual, whereby the lag of ignition may be so reduced as to make it possible to inject the fuel at nearer the top of the stroke, as will be explained. More air than usual is compressed and therefore more fuel may be injected, thereby giving the engine a higher rating per pound. Because of the high pressures contemplated the cylinder 15 is shown as surrounded by a reinforcing part 22 at the top where strength is most needed. As shown in Fig. 1, a jacket 23 encloses cylinder 15 but it is not essential to the functioning of the engine and is not claimed as jackets are very common. As shown in Figures 1 and 14, jackets 23 are intended to act only as passage-ways, or conduits for regenerated exhaust gases, as do conduits 48 in Figures 6 and 15. It is not claimed the jackets 23 or the contents thereof supply or withdraw heat to or from the cylinder walls. If they do it is purely incidental and is not claimed as a part of this invention. 27 is an air intake valve and 29 shows a valve through which the air compressed by the piston is forced into the chamber 30, from which it is drawn through valve 28 into cylinder 15 by the suction stroke of the piston.

24 is the exhaust valve through which the exhaust gases pass to the regenerator 19 by way of the short passage here shown and in Figure 8 only by dash lines but which passage is similar to exhaust passages 34 shown in section in Figs. 6, 14 and 15. From the regenerator 19, the reheated exhaust gases go through the short passage shown by dash lines, which passage corresponds to passages 48 in Figures 6 and 15, to and out of 26 for use to produce more power in a turbine or a low pressure cylinder or for any other desired purpose. A piston rod 35, a stuffing box 36 and a cross head 37 are also shown in this figure.

In Fig. 2 air is being drawn into the cylinder through valve 27 by the upward stroke of the piston, compressed on the downward stroke as shown in Fig. 3 and passed through valve 29 into 30, from whence it goes into the upper part of the cylinder through valve 28 when it is opened. In Fig. 4, the same air is being compressed by the upward stroke of the piston while another charge of air is being drawn into the cylinder under the piston through valve 27. Figure 5 shows injection of fuel through 31 against the hot cylinder head 18 to mingle with the highly compressed air at, or near the top of the compression stroke. At, or about the same time, a suitable charge of water is injected through 32 and directed against the cylinder wall and around the periphery of the piston to keep the parts in sliding contact workably cool; which means, with present lubricants, below 200° to 300° F. and certainly below 400° F. In present practice this is done by water jackets or air fins which thereby robs about 50% of the energy of the 3,000° flame. When the fuel meets the hot compressed air ignition and explosion drive the piston down on the power stroke. Meanwhile, the water around the inside of the cylinder wall has been flashed into steam to form a curtain around the said wall to protect it from the intense heat of the flame. The latent heat of vaporization is that withdrawn from the cylinder wall and not all directly from the flame. Thus, by this invention, a very great loss of energy of the combustion is averted, the necessary cooling of the sliding contact surfaces is more efficiently accomplished and the salvaged energy furnishes superheated steam.

After the explosion and later in the power stroke the super-heated steam mingles with the gases, adds to and prolongs the pressure on the piston to provide more power.

Recurring to Figures 1 and 2. After the power stroke and on the return stroke of the piston the burned gases are pushed through the opened valve 24 and then through the short passage shown by dash lines in Fig. 1, into regenerator 19 over 18, and red hot top of the imperforate cylinder head. In the case of multiple cylinders the regenerators may be interconnected as shown in Fig. 8. The temperature of the exhaust gases may be as low as 300° to 500° and the temperature of the part 18, which is over the 3,000° flame, may be 1,000° to 1,500° or more, according to design and the thickness of part 21. The gases are re-heated in regenerator 19 and then pass through the opening indicated by the dash lines in Fig. 1, then to and through 23 to be used to make more power in a low pressure cylinder or a turbine or for heating or any desired purpose. Thus, regeneration, which has long been the dream of power engineers, is neatly accomplished by this invention without the expenditure of additional fuel, as is necessary in the steam engineering practice of regeneration in which more live steam from the boiler is required.

Fig. 14 illustrates a two cycle engine with an imperforate cylinder head and regenerator similar to that shown in Fig. 1. Valves 27, 28 and 29, air chamber 30; the piston, piston rod and crosshead are all also similar but the exhaust valve 24 of Fig. 1 is replaced by exhaust ports 33, which are uncovered by the piston near the end of the power stroke. The exhaust gases pass through 34 to the regenerator 19 to be reheated and then go out through the short passage indicated by dash lines to the manifold and out at 26.

The operation of this engine will be obvious to those skilled in the art and is illustrated by Figures 9, 10, 11 and 12, which are diagrammatic views similar to Figures 2, 3, 4 and 5 but showing successive positions of the parts of an engine working on the two cycle principle.

Fig. 6 illustrates the arrangement of a pair of two cycle cylinders 38 and parts as, reinforcing rings 39, gaskets 40 and 41, heat transmitting portions 18 and a regenerator 19 receiving exhaust gases from passages 34 shown in section. The outer part of each head has a layer 47 of heat insulating material. The operation of Fig. 6 and its high pressure parts is quite similar to the engine of Fig. 14 and the diagrammatic views of Figures 9, 10, 11 and 12. Air first enters through 52 and by means of valves 53 and 28' is admitted below high pressure piston 54 and also below low pressure piston 55. Air compressed on the down stroke of these pistons passes by valves 56 and 29' into the chambers 57, and then from ports 58 into the combustion cylinders over the pistons for scavenging and for air charges when said ports are uncovered by each high pressure piston at the end of its power stroke, as here shown by the piston in the right hand cylinder, the exhaust ports 33' of which are also open for expulsion of the burned gases, which are now largely super-heated steam, through passage 34 and into regenerator 19. From the regenerator the gases pass through 48 and through valve 50 into a low pressure cylinder 51 to make more power by pressure on the low pressure piston 55, escaping through ports 59 at the ends of power strokes. Residual gases are pushed out of the low pressure cylinder through valve 60, shown in dash lines and shown more fully in Fig. 16, on the return stroke of the piston. It is obvious that valves 28', 29', 53 and 56 can operate automatically, whereas valves 50 and 60 are timed with engine operation in the usual way.

Fig. 7 shows a three way valve 61, which combines the functions of valves 50 and 60 of Fig. 6. As shown it is in position to serve as an input valve to admit hot gases to cylinder 51 for the power stroke, from which position it is then turned to exhaust through 62 on the return stroke of piston 55. When the blank portion 61 is turned to "cut off," between input and exhaust, the gases act expansively to produce power, as is usual in steam engine practice. The mechanism for operating the above valve from the crank shaft is conventional, very old and therefore not shown.

Fig. 8 shows a section of two pairs of cylinders of a multiple cylinder engine in which the cylinders are enclosed in a common outer casing 63, which takes the place of conduits 48 in Fig. 6. Passages 34, to deliver exhaust gases from the combustion cylinder to the regenerators 19 are here shown by dash lines but similar passages marked 34 are shown in section in Figures 6, 14 and 15, besides being indicated diagrammatically in Figures 9, 10, 11 and 12. From the regenerators the gases pass by way of casing 63 and through valves 50 to cylinders 51 for re-expansion to produce more power on the down strokes of the pistons 55, after which they are exhausted through ports 59. A partition 65, shown in section, seals off the upper part of space 63 and provides seats 66 for cylinders 38 and also sockets 67 for the upper ends of the low pressure cylinders 51.

Fuel injection upwards is indicated by sectional view 13.

The manner of injection of water and fuel is illustrated in Fig. 15, wherein water and fuel are injected through orifices 69 and 71 respectively by means of injection apparatus housed in casing 100, influenced by pressure in cylinder 38. Through pipe 84, the pressure produced by the compression stroke of the piston 54 in cylinder 38 actuates the water and fuel pumps in casing 100. The quantity of water and fuel furnished by said pumps is regulated by the needs of the engine through the effects of the temperature of the cylinder head part 18 and the exhaust gases acting upon the bi-metallic thermostat 72, which in turn actuates control parts not included in this disclosure and therefore not explained.

As shown in Fig. 15, the ring 39 contains a passage 68 communicating with the interior of the cylinder by downwardly directed orifices 69, whereby the water is directed towards the cylinder wall and piston head, the piston head being chamfered as shown at 70 to provide a V-shaped annular depression to receive the water. The fuel inlet 71 is directed upwardly, as shown in Fig. 13, towards the hot portion of the cylinder head so that the fuel is ignited almost instantly on meeting the highly compressed air. The resulting explosion, with the gases still uncooled by water jackets, exerts a more mighty thrust upon piston 54. The result of this manner of water injection will be that the steam formed from the injected water by heat withdrawn from the hot cylinder wall will, by the centrally located explosion, be caused to reside near the cylinder wall during the hottest part of the power stroke and then add to and prolong the pressure on the piston because it has been highly superheated by absorbing a large portion of heat from the cylinder wall, which heat is often more than 40% of the energy of the fuel spent in combustion in present internal combustion engines; thus accounting for the fact that they are less than 35% efficient. The salvaged portion of this usual waste can be very important for the formation of super-heated steam. Also, it should be pointed out that the fuel resources of our nation could be greatly conserved by general adoption of this invention, thereby adding to the wealth of the country in peace time and greatly increasing our security in case of war.

As shown the thermostat 72 through gear train 74, 75, 76, 77 and shaft 78 actuates pinion 79 to cause movement of racks 81, 82 the illustration of which latter is diagrammatic, the teeth being not shown, thereby actuating injection apparatus housed in casing 100. The details of the injection apparatus do not form a part of the invention claimed herein.

The passage 48, indicated by dash lines in Fig. 15 but similar to passages 48, shown in section in Figure 6, may lead to a low pressure companion cylinder or a turbine or, in event of the structure of Fig. 8 being utilized, the passage 48 becomes, in effect, like the interior of casing 63.

The volume of steam formed by the means herein described is such that this invention is not only an improvement in internal combustion engines but additionally it is also a steam engine with a very considerable increase of power over that which can be obtained from the combustion of a like amount of fuel in ordinary internal combustion engines with their usual great heat losses.

The air compressed below the pistons has a valuable function in cushioning the power stroke.

It is obvious that an engine of this invention may consist of one or more combustion cylinders only, or may be compounded.

The introduction of fuel and water below the heads of the cylinders as shown and described in the figured illustrations is very important as leaving said heads imperforate and thus avoiding the weakening and warping tendencies which perforations of any kind entail when subjected to great and violent changes of temperature. In fact, warped valve seats and cylinder head cracks are among the most common causes of internal combustion engine troubles, both in cost of manufacture and in their operation.

This application is filed as a continuation of my application Serial No. 351,617, filed August 6, 1940, now abandoned, for "Super Diesel Engine."

It is obvious that minor changes in the physical enbodiment of the invention may be made within the scope of the following claims without departing from the spirit of the invention.

I claim:

1. An internal combustion engine comprising, in combination: a combustion cylinder; a piston reciprocable therein; a compound head for said cylinder comprising an inner imperforate part and a second part overlying and spaced from said inner part to provide a passageway for exhaust gases; means to conduct exhaust gases from said cylinder to said passageway into contact with said inner part to be reheated thereby; means to inject fuel into said cylinder against said inner part; and means to utilize the heat restored to said gases.

2. The combination of claim 1 with means to inject water into said cylinder around the periphery thereof to cool the walls of the cylinder and to flash into steam, the expansion of which adds to the power exerted upon the piston by the expanding products of combustion.

3. An internal combustion engine comprising in combination: a combustion cylinder, a piston working therein, a piston head for said piston chamfered at its periphery, a heat transmitting head for said cylinder, means for introducing fuel into said cylinder in an upward direction towards the interior of said head, means for injecting water in a downward direction into the space provided by said chamfered head whereby to serve as an internal coolant for said cylinder, means for conducting exhaust gases including steam from said cylinder into contact with the exterior of said head to be reheated thereby, and means to utilize the energy of said thus reheated gases and steam.

4. An internal combustion engine comprising in combination: a combustion cylinder, a low pressure cylinder, pistons working in the respective cylinders, the combustion cylinder piston being chamfered about the periphery of the head thereof, means for introducing fuel into said combustion cylinder in an upward direction to contact the interior of the head thereof, means for injecting water about the periphery of the combustion cylinder in a downward direction into the space provided by said chamfer, an imperforate heat transmitting head for said combustion cylinder, means for delivering exhaust gases and steam from said combustion cylinder into the space above said head, means for enclosing said space to provide a passage for said gases and steam, and means for delivering the thus reheated gases and steam to said low pressure cylinder.

5. A combustion cylinder having a heat transmitting head, means for injecting fuel and water into said cylinder, means for enclosing said head to provide a passage thereover, thermostatic means housed in said passage, means actuated by said thermostatic means to control the amount of injected water and of injected fuel in accordance with heat conditions in said passage and means to utilize energy from exhaust gases and steam reheated in said passage by contact with said head.

6. In an internal combustion engine; the combination of a combustion cylinder and an imperforate head therefor; an internal shield for said head adapted to hinder heat conduction through said head for providing high temperatures within said cylinder to promote fuel ignition and increase of power; means to subject exhaust gases from said cylinder to heat radiated from said head; and means to utilize energy of said reheated gases.

EDWARD M. WARING.

REFERENCES CITED

The following references are of record in the file of this patent:

UNITED STATES PATENTS

| Number | Name | Date |
| --- | --- | --- |
| 673,038 | Theryc | Apr. 30, 1901 |
| 910,220 | Nichols | Jan. 19, 1909 |
| 1,138,938 | Davison | May 11, 1915 |
| 1,250,135 | Burk | Dec. 18, 1917 |
| 1,393,831 | Rossman | Oct. 18, 1921 |
| 1,508,153 | Beals | Sept. 9, 1924 |
| 1,662,590 | Thormeyer | Mar. 13, 1928 |
| 1,773,995 | Goldsborough | Aug. 26, 1930 |
| 2,016,921 | Goddard | Oct. 8, 1935 |
| 2,147,074 | Wyman | Feb. 14, 1939 |
| 2,218,522 | Butler | Oct. 22, 1940 |

FOREIGN PATENTS

| Number | Country | Date |
| --- | --- | --- |
| 205,476 | Great Britain | Apr. 12, 1924 |
| 255,048 | Great Britain | Sept. 26, 1927 |
| 452,232 | Great Britain | Aug. 19, 1936 |
| 360,790 | France | Mar. 10, 1906 |
| 365,083 | Germany | Dec. 9, 1922 |